E. ORÉ.
MANUFACTURE OF AMMONIA.
APPLICATION FILED OCT. 12, 1917.
1,266,147.
Patented May 14, 1918.
2 SHEETS—SHEET 2.
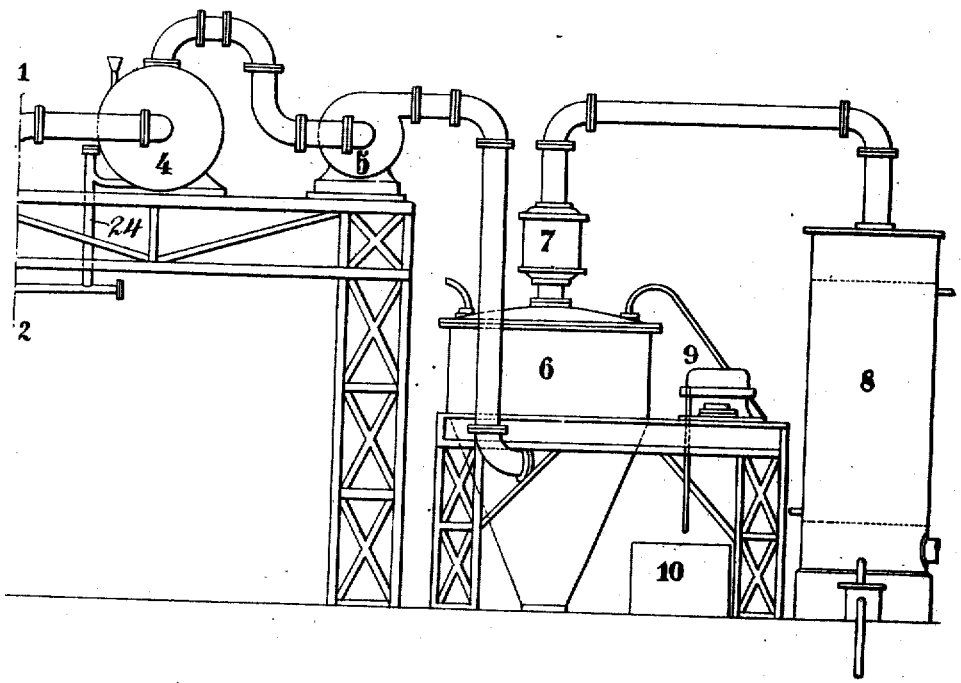
INVENTOR
Ernest Oré,
ATTORNEY.

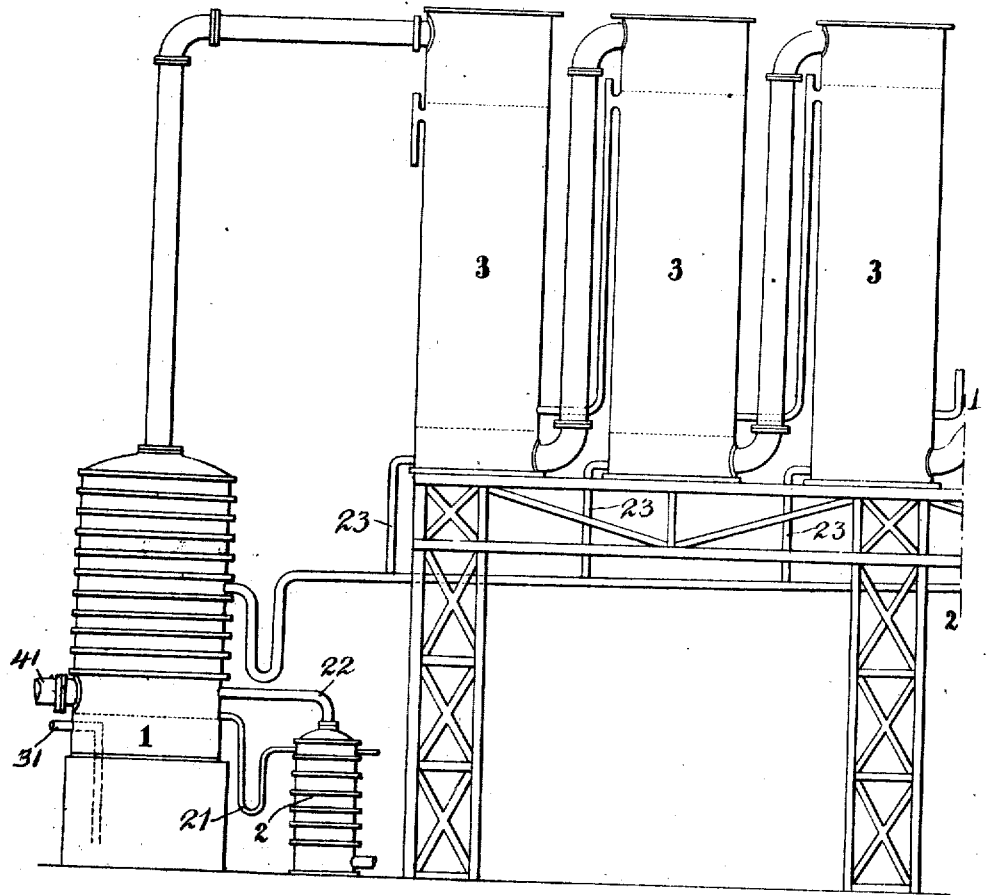

UNITED STATES PATENT OFFICE.

ERNEST ORÉ, OF CAEN, FRANCE.

MANUFACTURE OF AMMONIA.

1,266,147.  Specification of Letters Patent.  Patented May 14, 1918.

Application filed October 12, 1917. Serial No. 196,312.

*To all whom it may concern:*

Be it known that I, ERNEST ORÉ, a citizen of the Republic of France, and resident at Caen, (post-office address 11 Rue de la Masse,) France, have invented a new and useful Manufacture of Ammonia, which improved process is fully set forth in the following specification.

During the carbonization of coal in a closed vessel, ammonia is generated, either free or in combination; which ammonia distils over at the same time as the coal gas. Steam and other vapors also distil over and are collected and condensed, the steam dissolving part of the ammonia products, the rest of which is collected by washing the gas in clear water. The ammonia recovered in these two ways forms the ammonia liquor proper. The ammonia liquor is then separated, and is finally distilled so as to supply volatile ammonia which as it escapes from the distilling apparatus, is collected in a given absorbent, such as distilled water or sulfuric acid, according as it is desired to obtain, as the final product, ammonia water or ammonium sulfate. Generally it is the sulfate that is manufactured in this way.

This is an old method of recovering ammonia and is still almost universally used. As in its first operation or step the process does not give a final product, but yields only an intermediate product, ammonia liquor, it is known as an indirect process of recovery or of conversion to ammonium sulfate, owing to the fact that the final product is generally the sulfate. It would be a great improvement of the intermediate use of water could be dispensed with, and the gas containing the whole of the ammonia in volatile state could be sent direct into a selected absorbent, such as sulfuric acid.

This would avoid washing in water, and consequently avoid the use of ammonia washers and the apparatus for distilling ammonia water. The result would be a considerable reduction in the cost of installation, an economy of space and more particularly a considerable reduction in the cost of labor, maintenance and fuel. The processes suggested for the purpose of avoiding washing in water, are known as processes of direct and semi-direct conversion into sulfate. The former have hitherto given only costly industrial results.

The only processes which have been practically adopted are those called semi-direct processes. In these processes, condensed ammonia liquor containing more particularly fixed ammonia, is collected and treated as in the old indirect process. Only the volatile ammonia contained in the gas leaving the condensers is absorbed in sulfuric acid by washing. These processes substantially replace the old process of washing with water.

This invention relates to a process for the complete direct conversion into sulfate, and also for the direct complete recovery of the ammonia generated by carbonization in a closed vessel of coal or of other materials such as wood, lignite or peat based on the exhaustion of ammonia waters of condensation within their condenser; the exhaustion being effected out of contact with the gas forming the vehicle for the ammonia.

The process chiefly consists in adding a suitable material, such as lime or sodium carbonate, to the waters of condensation before they leave the condensing apparatus, but out of the circuit traversed by the gas.

The quantities of lime or sodium carbonate are determined in the usual manner in accordance with the quantities of fixed ammonia contained in the waters of condensation, and the fixed ammonia is converted into volatile ammonia within the apparatus in which these waters are condensed, the said apparatus being worked at such a temperature that the condensed waters can escape, can be exhausted, and still have too high a temperature to absorb volatile ammonia.

It is generally admitted that water does not absorb free ammonia above 70° C. On the other hand, ammonium carbonate escapes from its aqueous solutions at 78° to 80° C.; but as in this case an ammonia solution of complex and variable composition is to be dealt with, obviously the temperature suitable for the treatment in question, must be determined experimentally in accordance with the composition of the ammonia liquor.

It is obvious that the small quantity of ammonia liquor which may escape condensation in the decomposing apparatus, but is condensed farther on in the subsequent apparatus, is to be returned to the said decomposing apparatus.

Having thus discharged the waters of condensation completely exhausted, and having separated the whole of the ammonia in the gaseous current in volatile form, it is merely necessary to complete, by one of the numerous existing or analogous means, the elimination of the last traces of tar contained in the gas, and to recover the ammonia, the whole of which is now contained in the gas in a volatile state, by causing the said gas to bubble either in sulfuric acid, if ammonium sulfate is to be obtained, or in some other suitable absorbent.

The process is particularly applicable to the manufacture of ammonium sulfate, but it can also be used for the manufacture of any other compound that can be carried out in a similar manner by the use of some other absorbent than sulfuric acid.

The invention includes the use for the decomposition of fixed ammonia, of lime, milk of lime, sodium carbonate or other similar material in any form, such as powder, or fragments, in aqueous solution or otherwise.

The process can also be used for the recovery of ammonia obtained not only from coal, but also from any other organic matter which is treated by distillation or carbonization in a closed vessel, or so as to supply under similar conditions a quantity of recoverable ammonia.

The process can be carried out in any kind of apparatus in which carbonization or distillation or a similar treatment takes place, such as coke ovens, gas retorts or gas generators.

More particularly in the case of the distillation of coal in coke furnaces or gas retorts, the process can be applied, whatever be the method employed for condensing the tar contained in the gas generated, whether this condensation of tar (also called detarring of gas) takes place at a moderate temperature, for instance not exceeding 40° C., or at a high temperature in the neighborhood of 100°.

The accompanying drawing shows by way of example an apparatus for the direct total conversion of ammonia into ammonium sulfate with de-tarring of the gas at a moderate temperature.

The gas is admitted through pipe 41 at the left hand side of the apparatus directly from the hydraulic main at a temperature sufficiently high to avoid any preliminary condensation of water or any deposit of ammonium salts. To that end, if necessary, the hydraulic main and the piping can be covered with heat insulating material. The gas enters at the bottom of a column 1 of large diameter having a fairly deep base and disks or plates provided with cups and overflows similar to those of distilling columns, and rises through the disks of the said column, which latter constitutes a condenser. During its ascent, the gas cools somewhat, and deposits on the disks condensed ammonia waters and tar which liquids descend from one disk to another. The condensed waters in which the gas splutters or bubbles at high temperature, cannot retain volatile ammonia, but dissolve fixed salts of ammonia. At the bottom of the column the condensed waters and the tar separate by gravity. The tar is discharged (see the left hand side in the figure) through pipe 31 to a suitable tank or other receiver, not shown. The water of condensation escapes through pipe 21 as shown on the right hand side of the figure, and passes to a decomposing column 2 charged with lime, which may be of any desired type. In this column, the ammonia water is mixed with milk of lime fed in the usual manner, and the fixed ammonia salts are decomposed; their acid being fixed by the lime, and the ammonia released passing through pipe 22 to the base of the column 1, where it becomes mixed with the ascending current of gas. At the bottom of the column 2 the spent milk of lime is discharged with the exhausted ammonia waters. It is advisable to use two lime columns which are utilized alternately, in order to facilitate the cleaning frequently required in this kind of apparatus.

The gas, after having passed from bottom to top through the column 1, passes into condensers 3 and 4, of sufficient number for perfect detarring, the condensers 3 being of the surface type. These condensers 3 and 4 are on a higher level than the column 1, so that the condensates formed therein, return automatically by gravity through pipes 23 and 24 to the disks of the column 1. The said condensates, tar and ammonia water, thus descend in the column 1 and behave as has been seen, in the same way as the condensates formed in the column itself.

After escaping from the condensers 4 at a moderate temperature, the gas completely deprived of tar and containing the whole of the ammonia in volatile form, is drawn in by a suitable exhauster or fan 5 and forced by the same apparatus into a sulfuric acid saturator 6 in which the formation of ammonium sulfate takes place. The gas escapes from the saturator completely deprived of ammonia and passes into a separator 7 in which it leaves the drops of acid that it may have carried away. Thereupon it is cooled and dried in a condenser 8 (or in several if necessary) and becomes suitable for any subsequent use.

The sulfate formed in the saturator, is withdrawn by means of an ejector and sent to a centrifugal drier 9 whence it falls dry and neutral on a conveyer band which conveys it to the store. The mother liquor obtained by centrifuging, is discharged into a tank 10 whence it is sent back to the saturator by ordinary means. The saturator is of course provided with the necessary piping for the reception of the said mother liquor and of sulfuric acid.

The installation effects therefore direct total conversion into ammonium sulfate without the condensation waters being collected, handled or distilled, and on the other hand without contact of the gas with the alkaline liquid which decomposes the fixed salts, the whole taking place in the condensing apparatus.

It is obvious that the process is applicable when the condensation of tar takes place at a high temperature, for instance at about 100° and this can be understood without reference to any other apparatus than that shown in the accompanying drawing.

De-tarring by hot process can be effected by means of any existing or similar apparatus. Immediately behind the said apparatus is placed a condensing column similar to the column of the column 1 accompanied by a lime column of the type 2. This apparatus works exactly as described in the preceding case. As the gas has been previously deprived of tar, the discharge of tar at the bottom of the column 1 can be done away with, and the condensers 4 behind the column 1 become useless. It is merely advisable to cause the gas to pass, after the column 1, a reflux dephlegmator with a surface cooled by a water current, which can be regulated so as to maintain a suitable temperature, in order that the gas may contain the whole of the ammonia in a volatile state. This gas can then be drawn in and forced into a saturator, and the operation will continue as in the preceding case.

Having now particularly described and ascertained the nature of my said invention and in what manner the same is to be performed, I declare that what I claim is:—

1. In the process of manufacturing ammonia, subjecting an ascending current of hot gas generated by carbonization of organic material to a partial cooling, thereby removing therefrom the heavy tar constituents and the ammonia liquors by condensation; separating out the ammonia liquors while above the temperature required for decomposition of the ammonium compounds therein and immediately subjecting the hot, separated ammonia liquors to the decomposing action of an alkaline substance in the absence of extraneously applied heat, thereby liberating ammonia, and discharging the decomposed liquors freed from ammonia at a temperature above that permitting the absorption of the ammonia.

2. In the process of manufacturing ammonia, subjecting an ascending current of hot gas generated by carbonization of organic material to a partial cooling, thereby removing therefrom the heavy tar constituents and the ammonia liquors by condensation; separating out the ammonia liquors while above the temperature required for the decomposition of the ammonium compounds therein and immediately subjecting the hot, separated ammonia liquors to the decomposing action of an alkaline substance in the absence of extraneously applied heat, thereby liberating ammonia, and discharging the decomposed liquors freed from ammonia at a temperature above that permitting the absorption of the ammonia, and delivering the ammonia to the fresh gas prior to cooling the same.

In testimony whereof I have signed this specification in the presence of two subscribing witnesses.

ERNEST ORE.

Witnesses:
EMILE LEDRET,
CHAS. P. PRESSLY.